Oct. 3, 1967 L. A. ERICKSON ETAL 3,344,568
SPAR TOWER ERECTING AND ANCHORING SYSTEM
Filed Jan. 29, 1965
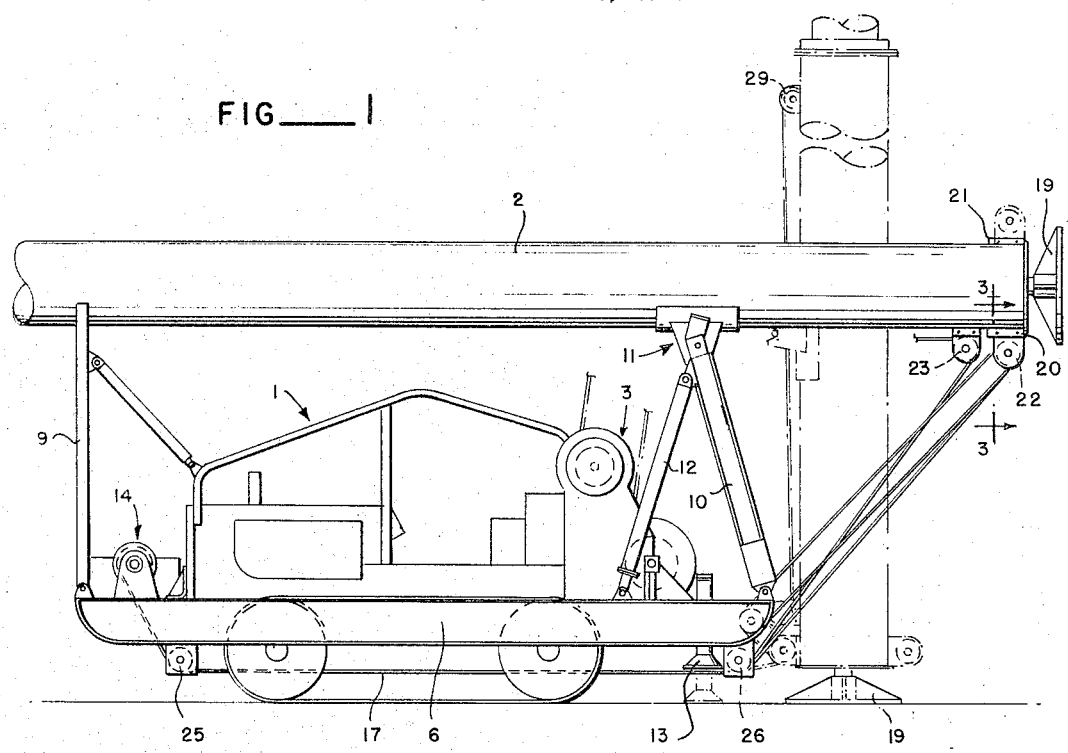
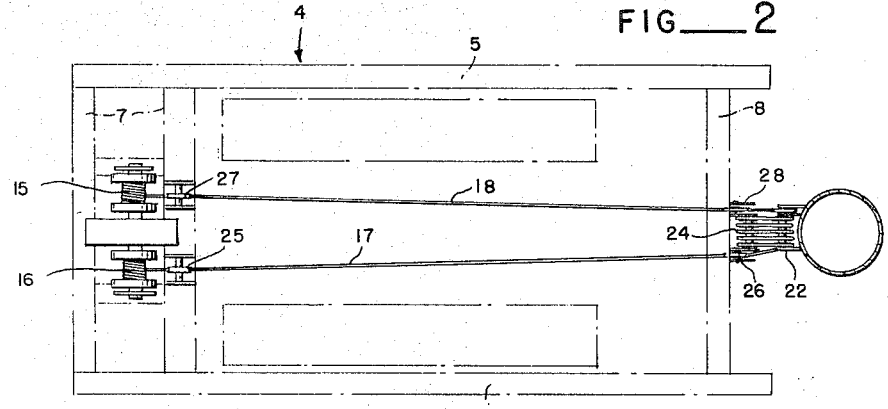
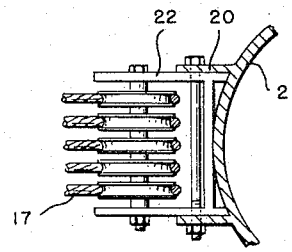
INVENTORS
LOUIS A. ERICKSON
ELMER R. HOGAN
BERNHARD R. KLINKE
BY Seed & Berry
ATTORNEYS

United States Patent Office 3,344,568
Patented Oct. 3, 1967

3,344,568
SPAR TOWER ERECTING AND ANCHORING
SYSTEM
Louis A. Erickson, Seattle, Elmer R. Hogan, Bellevue,
and Bernhard R. Klinke, Seattle, Wash., assignors to
Smith-Berger Manufacturing Corporation, a corporation of Washington
Filed Jan. 29, 1965, Ser. No. 429,004
2 Claims. (Cl. 52—116)

ABSTRACT OF THE DISCLOSURE

A spar tower anchoring system for detachably connecting the bottom end of a ground-supported spar tower to a vehicle upon which yarder means is carried. The vehicle which mounts the yarder also carries an A-frame structure which, when connected to the tower provides a trunnion axis about which the tower is pivoted from a horizontal transport position to a vertical ground supported use position. A first bank of sheaves is carried on the bottom end of the tower in alignment with a second bank of sheaves carried on the rear end of the vehicle. A winding drum and power means therefor is carried on the opposite end of the vehicle for winding in and paying out a cable which passes beneath the vehicle through appropriate guide means and then about the sheaves of the first and second banks of sheaves on the tower and the vehicle respectively. The tower is pivoted about its trunnion axis from the horizontal to the vertical position by hauling in on the cable and once the tower is erected and secured with guy lines, the cable acts, in combination with the two banks of sheaves, to tie the end of the vehicle to the bottom of the tower. When it is desired to remove the vehicle from the erected tower, the cable is disconnected and hauled in and the vehicle removed. The tower is provided with mounting means for the first bank of sheaves on opposite sides of its bottom end portion so that the vehicle may be connected to either side of the tower if desired.

---

The present invention relates in general to ground supported portable spar towers and more particularly to a novel system for anchoring or tying the bottom end of such towers to a carrier vehicle which is also used to mount a yarder and winding drums during use of the tower.

It is the general practice to permanently attach portable telescoping spar towers to a tracked or other type vehicle so that, when in the raised or erected position, the tower is supported vertically by the vehicle. The vehicle for transporting the spar tower also normally carries the yarder engine and various winding drums for raising the sections of the spar tower, operating the main line and haulback cables and any other rigging required during the logging operation. In such a setup, no problem exists in maintaining the erected spar tower in fixed relation to the yarder since both the spar tower and the yarder are fixedly supported on the vehicle. In some installations, however, it is desirable to support the spar tower directly on the ground so that the carrier vehicle and yarder unit may be moved away from the tower for various reason e.g., when the spar tower is not in use. In this situation, the telescoping sections of the spar tower are extended and locked into place and the necessary guy cables are strung so that the tower is self supporting and completely independent from the carrier vehicle and yarder unit. In this instance, with the vertical support for the tower being supplied by the ground, the efforts of the winding drums of the yarder in pulling a cable over a fairlead or other sheave on the top of the tower or in pulling in on a cable to initially raise the sections of the tower result in a tendency to lift the yarder unit and the vehicle upon which it is mounted. The lighter the equipment including the vehicle and yarder, the more severe the problem becomes and, with relatively light equipment, the load capacity of the yarder may be limited by the weight of the yarder and vehicle. The present invention contemplates an anchoring system whereby the vehicle is removably tied down to the bottom end of the ground supported spar tower when the yarder is in operation. In this manner, with the yarder and carrier vehicle being tied to the bottom end of the tower, there is no tendency to lift the yarder and vehicle when a cable is being hauled in under load.

The primary object of the present invention is, therefore, to provide a tie-down or anchoring system for a ground supported spar tower and a carrier vehicle wherein the carrier vehicle and yarder mounted thereon may be fixedly attached to the bottom end of the tower.

Another object of the present invention is to provide an anchoring system of the character described wherein cable winding drums on the carrier vehicle which are normally used for erecting the tower may be used to secure the vehicle and associated yarder to the bottom of the tower to prevent the tendency of the vehicle to lift during normal cable hauling functions of the yarder.

Yet another object of the present invention is to provide an anchoring system of the character described which permits complete removal of the carrier vehicle and yarder from the spar tower and which permits the vehicle and yarder to be relocated about the base of the tower and fixed in place.

Other more particular objects and advantages of the present invention will, with the foregoing, appear and be understood from the following description and claims, the invention consisting of the novel construction and adaptation and combination of parts hereinafter described and claimed.

Reference is now made to the accompanying drawings in which:

FIG. 1 is a side elevation of a carrier vehicle and ground supported spar tower utilizing the anchoring system of the present invention;

FIG. 2 is a partially schematic plan view showing the winding drum and cable system of the present invention; and FIG. 3 is a detail of the sheave attachment arrangement for the tower.

Referring now to the drawings wherein like reference numerals indicate identical parts in the various views, FIG. 1 illustrates a carrier vehicle, indicated generally at 1, which may be a tracked vehicle or any other vehicle suited to the use. The vehicle 1 is used to transport telescoping spar tower 2 and also includes a yarder unit 3 mounted on the rear end of the vehicle. The yarder unit 3 may be any conventional yarder which provides winding drums for hauling in and paying out the various cables used in logging operations such as the main line and haul back lines as will be understood by those skilled in the art.

In the present embodiment the vehicle 1, being a rather light weight unit, may be provided with a rectangular frame 4 extending about the vehicle. The frame 4 may include longitudinal side beams 5 and 6 and suitable front and rear cross members 7 and 8 shown in FIG. 2 which may be secured to the vehicle in any suitable manner so as to provide a mounting for the spar tower in its transport position as illustrated in FIG. 1.

The spar tower 2 is supported in its transport position on a vertical support 9 which may be attached to the front end of the frame 4 and includes a cradle for receiving the upper end of the tower in a conventional manner. On the opposite end of the vehicle, an A-frame 10 has the lower ends of its legs pinned to frame 4 and is arranged to pivot on a detachable connector assembly 11 which is part of the tower, the details of which form no part of the present invention. The connector assembly 11 functions to releasably engage the tower and to provide a pivot point about which the tower is pivoted to the vertical dotted line position shown, after which the connector is disengaged. The A-frame 10 may be pivoted about its pivotal connection with the frame 4 by means of hydraulic rams or the like 12 to accommodate the erected position of the tower. The frame 4 may also be provided with hydraulic stabilizing jacks 13 as is conventional in the art.

According to the present invention, a double drum winch unit 14 is mounted on the forward portion of the frame 4 and includes the winding drums 15 and 16 with control means, not shown, for independent operation of the drums. The drum 16 is used to haul in and pay out the cable 17 for moving the tower 2 to the erected position and for accomplishing the tie-down or anchoring function of the present invention. The drum 15 is used to haul in and pay out a cable 18 for raising the telescoping sections of the tower once the tower is in the erected position as will presently be described.

The bottom end of the tower 2 is provided with a ground engaging base member 19 upon which the tower rests as illustrated in FIG. 1 in the erected position. Also mounted at the bottom end of the tower 2 is a first set of brackets 20 and a second set of brackets 21 on opposite sides of the tower with the brackets being adapted to receive a bank of sheaves 22 which may be pinned in place to the brackets 20 or the brackets 21 for a purpose to be described. In addition to the bank of sheaves 22, a single sheave 23 is mounted on one side of the tower and may be located above the brackets 20. A corresponding bank of sheaves 24 is mounted on the cross member 8 of the frame 4 at the rear of the tractor or vehicle and will be positioned so as to be in alignment with the individual sheaves of the bank 22.

The cable 17 comes off of the drum 16 and passes downwardly about a fleeting guide sheave 25 mounted beneath the frame 4 as illustrated in FIG. 1 and passes rearwardly beneath the vehicle and about a second fixed guide sheave 26 mounted on the frame member 8 at the rear end of the vehicle. From the sheave 26, the cable 17 passes alternately about each of the sheaves of the bank 22 and each of the sheaves of the bank 24 and may be finally dead headed on either the bank of sheaves 22 or the bank of sheaves 24. It will be understood that the number of sheaves in the banks 22 and 24 may be varied in any given instance and the number of sheaves used will determine the holding strength of the tie-down system.

The cable 18 coming off the drum 15 passes about the guide sheave 27 mounted on the underneath side of the frame 4 and passes forwardly beneath the vehicle to a second guide sheave 28. The cable 18 then passes about the guide sheave 23 of the tower and then upwardly along the lower section of the tower and about an upper sheave 29 and into the tower section for the purpose of telescoping the inner section of the tower in a manner well known in the art.

With the arrangement of cables and sheaves described, the tower 2 is initially moved to the erected position shown in dotted lines in FIG. 1 by hauling in on the cable 17 to pivot the tower about the pivotal axis of the connector assembly 11. At the same time, the slack in the cable 18 may be taken in by the drum 15. The rams 12 will, of course, be extended to allow the connector assembly to accommodate the vertical position of the tower. Hauling in on the cable 17 also shortens the length of the passes of the cable between the bank of sheaves 22 and the bank of sheaves 24 to move the bank of sheaves into close proximity and to securely tie the bottom end of the tower to the rear end of the frame 6 of the vehicle. Once the tower is in the erected position, the cable 18 may be hauled in to extend the upper section of the tower which is then mechanically locked in position. Guy cables may then be set for the tower and the tower is ready for use. With the tower in this position and tied to the rear end of the vehicle 1, the winding drums of the yarder 3 may be used to handle the main and haulback cables in the conventional manner with the vehicle 1 being restrained by its connection with the lower end of the tower so as to prevent any lifting of the vehicle when the main and haulback cables are loaded.

In the event that it is desired to disconnect the vehicle from the tower for any reason, the cable 17 may be disconnected and wound in and all other cables disconnected to allow the vehicle 1 to be driven away from the tower. In certain instances, it may be desirable to relocate the vehicle on the opposite side of the tower, in which case the bank of sheaves 22 will be switched to the brackets 21 and pinned in place.

When the spar tower is to be replaced on the vehicle for transport as shown in FIG. 1, the vehicle is moved into place and the cables 17 and 18 again connected. The telescoping portion of the tower will be lowered by paying out the cable 18 and the connector assembly 11 will again be connected to the tower to provide the pivot point. The tower is moved from the erected position to the horizontal transport position by operating the rams 12 and paying out the cable 17 to allow the tower to move to the lowered position shown in FIG. 1.

It will be readily apparent to those skilled in the art that the present invention provides novel and useful improvements in anchor systems for ground supported spar towers of the character described. The arrangement and types of structural components utilized within the invention may be subjected to numerous modifications well within the purview of this invention and applicant intends only to be limited to a liberal interpretation of the specification and appended claims.

Having thus described the invention, what is claimed as new and desired to be secured by Letters Patent is:

1. In combination with a portable spar tower and a carrier vehicle including a yarder device and means to support said tower in a substantially horizontal transport position and to allow said tower to be pivoted to a substantially erected position to be completely supported by the ground, an anchoring device for securing said vehicle and yarder to the bottom end of the tower in the erected position comprising; a winding drum mounted on said vehicle, a first bank of sheaves adapted to be carried on the bottom end of said tower, first and second mounting means on opposite sides of the bottom end of the tower for receiving said first bank of sheaves, and means to detachably fix said first bank of sheaves alternately to one or the other of said mounting means, a second bank of sheaves mounted on one end of said vehicle and adapted to be substantially aligned with said first bank of sheaves, said winding drum being mounted on the opposite end portion of the vehicle from said second bank of sheaves, and cable means on said drum, said cable means passing beneath said vehicle and alternately about the sheaves of said banks of sheaves with the free end thereof being fixed to either the vehicle or the tower, whereby said tower may be pivoted to the erected position by hauling in on said cable, said cable providing a releasable anchoring connection between the bottom of said tower and the vehicle in the erected position of the tower.

2. The combination according to claim 1 including; guide sheaves on said vehicle for guiding said cable beneath the vehicle, said cable means extending from said winding drum along substantially the full length of said vehicle to said banks of sheaves.

References Cited

UNITED STATES PATENTS

| | | | |
|---|---|---|---|
| 2,241,275 | 5/1941 | Shinn et al. | 52—116 X |
| 2,880,827 | 4/1959 | Gilmore | 52—120 |
| 3,033,526 | 5/1962 | Priest | 254—139.1 |
| 3,045,973 | 7/1962 | Slagle | 254—139.1 |

JOHN E. MURTAGH, *Primary Examiner.*

R. S. VERMUT, *Assistant Examiner.*